T. HAVILAND.
Case or Box for Holding Cups and Saucers.
No. 210,688. Patented Dec. 10, 1878.
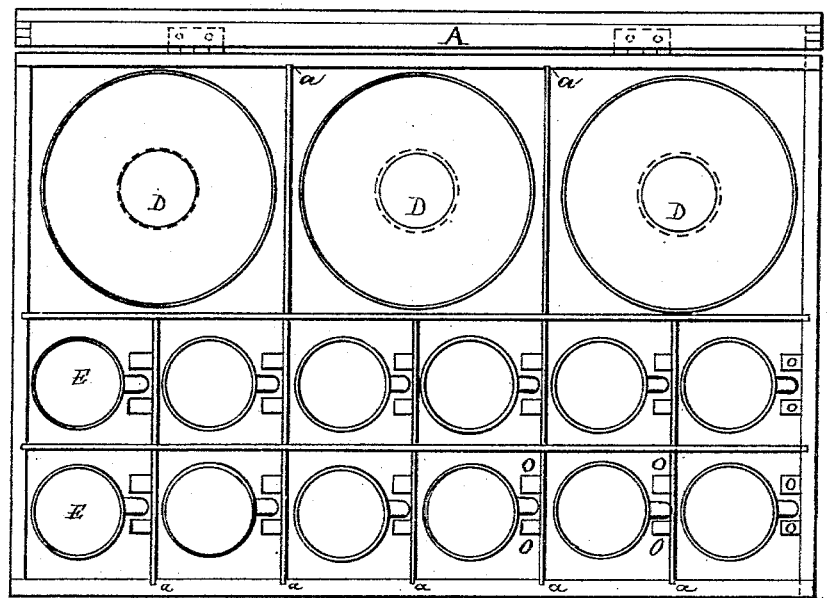
Fig. 1
Fig. 2
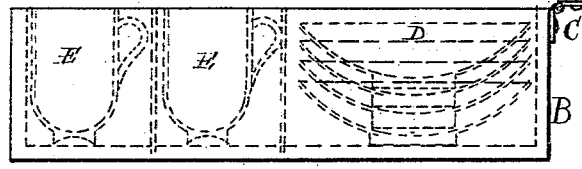

UNITED STATES PATENT OFFICE.

THEODORE HAVILAND, OF NEW YORK, N. Y.

IMPROVEMENT IN CASES OR BOXES FOR HOLDING CUPS AND SAUCERS.

Specification forming part of Letters Patent No. 210,688, dated December 10, 1878; application filed September 28, 1878.

*To all whom it may concern:*

Be it known that I, THEODORE HAVILAND, of the city, county, and State of New York, have invented a new and useful Case or Box for Holding Cups and Saucers, of which the following is a specification, reference being had to the drawings which form part of this specification.

My invention relates to boxes or cases arranged to hold cups and saucers; and consists of a box provided with a hinged cover, and compartments of sizes proportionate to the difference in size between the cups and saucers, the compartments for the cups being arranged to hold one cup each, and those for the saucers being arranged to hold four saucers each.

I am aware that boxes have been made with compartments of varying sizes; but I am not aware that they have been made previous to my invention arranged in the manner and for the purposes herein set forth.

The box or case herein set forth is put together without nails, being tongued together at its corners, and the dividing-strips to the compartments are notched into the side pieces of the case to keep them in place, no nails being used to hold the box together.

To enable persons skilled in the art to make and use my invention, I will proceed to describe it, referring to the drawing, which makes part of this specification, in which the same letters indicate similar parts in the several drawings.

Figure 1 is a top view of my case, with the cover A raised to expose to view the cups and saucers in their respective compartments, and showing the dividing-strips notched into the side pieces at *a a a*, &c., to hold them in place, without the use of nails. The sides are shown at the corners, tongued together, also, without nails. The cover A is hinged to the box B, and also constructed without nails. O O are lugs to secure the cups by the handles in their places.

Fig. 2 shows the box or case in side view, with the cover A raised and hinged to case B.

The cups and saucers are shown in dotted lines—one cup in each cup-compartment, and four saucers in each saucer-compartment. The cups are turned about to more readily show the handles.

The whole is arranged to secure the cups and saucers against breakage in transportation, and to form a convenient case to exhibit them in when in store, and to enable one to know readily when one or more are missing, after being used, without counting.

Such a case will prove of great convenience to housekeepers for the safe-keeping of expensive china-ware, &c.

Having now described my invention, what I claim as my invention, and desire to secure by Letters Patent, is—

A box or case for cups and saucers, tongued together at its corners, having a hinged cover, and provided with compartments of two sizes, the partitions being secured in position, as shown and described, said smaller compartments being provided with lugs or projecting pieces on one side to hold the cups firmly by their handles, as shown and described, the whole being constructed in the manner and for the purposes specified.

THEODORE HAVILAND.

Witnesses:
 THOS. P. HOW,
 JAMES M. HICKS.